(12) United States Patent
Anderson et al.

(10) Patent No.: US 10,550,012 B2
(45) Date of Patent: Feb. 4, 2020

(54) SOFTENER EDUCTOR WITH EMBEDDED CHECK VALVE

(71) Applicant: CULLIGAN INTERNATIONAL COMPANY, Rosemont, IL (US)

(72) Inventors: Douglas Anderson, St. Charles, IL (US); Harkirat Sahni, Tampa, FL (US); David Jan West, Skokie, IL (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 0 days.

(21) Appl. No.: 16/240,545

(22) Filed: Jan. 4, 2019

(65) Prior Publication Data

US 2019/0210895 A1 Jul. 11, 2019

Related U.S. Application Data

(60) Provisional application No. 62/614,218, filed on Jan. 5, 2018.

(51) Int. Cl.
*B01F 5/04* (2006.01)
*C02F 1/42* (2006.01)
*B01J 49/75* (2017.01)

(52) U.S. Cl.
CPC ............... *C02F 1/42* (2013.01); *B01F 5/043* (2013.01); *B01J 49/75* (2017.01); *C02F 2201/005* (2013.01); *C02F 2209/40* (2013.01)

(58) Field of Classification Search
CPC . B01F 5/04; B01F 5/043; B01F 5/0413; B01J 49/75; C02F 1/42; C02F 2201/005; C02F 2209/40
See application file for complete search history.

(56) References Cited

U.S. PATENT DOCUMENTS

| | | | |
|---|---|---|---|
| 2,597,693 | A | 5/1952 | Wolcott, Jr. |
| 2,902,155 | A | 9/1959 | Lundeen |
| 3,006,376 | A | 10/1961 | Schulze et al. |
| 3,138,553 | A | 6/1964 | Mollring |
| 3,216,450 | A | 11/1965 | Timmons |
| 3,335,752 | A | 8/1967 | Hiers et al. |
| 3,460,566 | A | 8/1969 | Heartstedt et al. |

(Continued)

OTHER PUBLICATIONS

International Search Report from corresponding International Patent Application No. PCT/US2019/012458, dated Mar. 7, 2019.

*Primary Examiner* — Terry K Cecil
(74) *Attorney, Agent, or Firm* — Greer, Burns & Crain, Ltd.

(57) ABSTRACT

An eductor for a water treatment system, including an eductor body having an inlet end and an opposite outlet end, the body defining an interior with a nozzle chamber and a flared conical portion. A jet nozzle is provided that is dimensioned for location in the nozzle chamber, defining an internal passage in fluid communication with the interior. A duckbill valve located in the jet nozzle includes a base from which project a pair of inherently biased, complementary flaps, free ends of the flaps oriented to open towards the outlet end. A mesh cap has a porous exterior wall defining a cavity in fluid communication with the interior, the cap having an open end engageable in the inlet end of the eductor body so that upon attachment of the mesh cap to the inlet end, the duckbill valve is held in position in the internal passage of the jet nozzle.

15 Claims, 8 Drawing Sheets

(56) References Cited

U.S. PATENT DOCUMENTS

| | | | |
|---|---|---|---|
| 3,538,942 A | 11/1970 | Lyall et al. | |
| 3,585,441 A | 6/1971 | LaRocca | |
| 4,210,533 A | 7/1980 | Astl | |
| 4,810,170 A | 3/1989 | Ide | |
| 4,889,623 A | 12/1989 | Prior et al. | |
| 5,066,393 A | 11/1991 | Padera et al. | |
| 5,556,259 A | 9/1996 | Hlavenka | |
| 5,628,899 A | 5/1997 | Vaughan | |
| 6,644,349 B2 | 11/2003 | Scanlan et al. | |
| 6,776,901 B1 * | 8/2004 | Vaughan | G05D 7/0186 137/1 |
| 7,032,760 B2 | 4/2006 | Walton et al. | |

\* cited by examiner

SOFTENER EDUCTOR WITH EMBEDDED CHECK VALVE

RELATED APPLICATION

This application claims priority under 35 USC 119 from U.S. Provisional Application Ser. No. 62/614,218 filed Jan. 5, 2018, which is incorporated by reference.

BACKGROUND

The present invention relates to control systems for water treatment apparatuses, preferably but not restricted to water softeners, and more specifically to an improved brine eductor connecting a water softener brine tank to a softener control valve.

While treating hard water, as is performed in conventional water softeners, a bed of ion exchange resin or other material in a main water softener housing removes calcium and magnesium ions from the water and replaces them with sodium ions. As the hard water passes through the bed, it exchanges these hard water ions with sodium in the first soft resin it meets, creating a front or wave of ion-exchange activity called the reaction zone. As the ion exchange process continues over time, the resin bed eventually becomes ineffective for softening and must be periodically regenerated when the amount of available sodium is depleted and the ion-exchange material is saturated with calcium and magnesium. Water treatment is then suspended while the ion-exchange material is regenerated in a multistep process to flush the calcium and magnesium ions from the resin and restore the sodium level.

A series of steps is used to replace the hard water ions with sodium ions, making the ion-exchange material active again for water conditioning. Typically, the bed is first backwashed, by reversing the flow of the incoming water, to remove sediment and loosen the bed. Next, the bed is contacted with a brine solution, whereby the ion-exchange material takes sodium ions from the high concentration brine solution and displaces the calcium and magnesium ions into the brine and out to waste. When an optimum amount of brine solution has been delivered, rinsing continues until virtually all traces of the brine solution and the unwanted hard water ions in it are discharged from the bed. After being rinsed to remove residual brine, the bed has been restored to the sodium state, known as soft resin, and is then returned to service treating hard water.

Preparation of the brine solution typically takes place in a brine tank that is kept separate from the resin tank. The brine tank, which contains a supply of salt, is filled with a measured amount of water to form a saturated salt solution. The salt supply must be replaced periodically due to depletion after repeated regenerations. During the brining or brine draw cycle of the softener control valve, brine is conventionally drawn from a remote brine tank through the softener control valve, and is directed into the resin tank. In conventional softeners, this act of drawing the brine is accomplished using a Venturi or eductor valve. Such valves are disclosed in U.S. Pat. Nos. 3,006,376; 3,538,942 and 6,644,349, all of which are incorporated by reference. Historically, eductors are an efficient way of using a venturi to discreetly mix or draw fluids from 2 to 3 different lines. As such, eductors are typically designed with a direction in mind, yet can still permit a reverse flow of fluid if provided with sufficient backflow. Such eductors are often mounted in water softener control valves, an example of which is disclosed in US Patent Publication No. 2017/0114903, incorporated by reference herein.

While conventional eductors are known to include check valves for prevention of the unwanted flow of brine back into the source or untreated water, such valves are relatively expensive and mechanically complicated. Alternate solutions to the brine draw process involve mounting external check valves, which are also considered commercially undesirable due to material and labor expense. Although there is a continuing need to prevent the flow of brine into the source water, conventional contractors prefer to obtain this preventive feature at reduced cost.

Accordingly, there is a need for an improved eductor valve with a simple but effective check valve.

SUMMARY

The above need is addressed by the present eductor, suitable for use in a water softener or similar water treatment apparatus. An important feature of the present eductor is an embedded or internal check valve constructed and arranged for preventing flow in a reverse direction. In the operational environment of a water softener, such a reverse flow, also referred to as a reverse eduction, has the potential for mixing raw or untreated water with brine that can inject mixed or contaminated fluids into the system or by extension, the water supply. In the preferred embodiment, the present check valve is a duckbill type valve having a pair of integrally biased, complementary lips. The present duckbill valve is held in place in a jet nozzle, which in turn is mounted in a conventional eductor housing. The jet nozzle is held in position by a mesh cap. A compression ring is placed between a base of the duckbill valve and the mesh cap for locating the duckbill valve in position, and for exerting a more uniform clamping force on the duckbill once the mesh cap is installed.

The purpose of the embedded valve is to check the flow at the source, instead of conventional methods of installing large and cumbersome flow-control kits at the source. For a given pipe size, the embedded eductor uses a valve approximately 65 to 85% smaller than one in a comparable flow control kit. The embedded valve is also subjected to only 10% of the pressure experienced at the inlet of the system, which increases the lifetime and durability of the product. This efficiency in both size and mass allows for a lower cost and lower impact design. Also, the use of a compression ring to facilitate sealing of the duckbill valve results in a leak-free condition at 13 in Hg vacuum, an upcoming standard to be published by the Water Quality association.

More specifically, the present invention provides an eductor for use in a water treatment system, including an eductor body having an inlet end and an opposite outlet end, the body defining an interior with a nozzle chamber and a flared conical portion. A jet nozzle is provided that is dimensioned for location in the nozzle chamber, defining an internal passage in fluid communication with the interior. A duckbill valve located in the jet nozzle includes a base from which project a pair of inherently biased, complementary flaps, free ends of the flaps oriented to open towards the outlet end. A mesh cap has a porous exterior wall defining a cavity in fluid communication with the interior, the cap having an open end engageable in the inlet end of the eductor body so that upon attachment of the mesh cap to the inlet end, the duckbill valve is held in position in the internal passage of the jet nozzle.

In another embodiment, an eductor is provided for use in a water treatment system, and includes an eductor body having an inlet end and an opposite outlet end, the body defining an interior with a nozzle chamber and a flared conical portion, a jet nozzle dimensioned for location in the nozzle chamber, defining an internal passage in fluid communication with the interior, the internal passage defining an annular shoulder. A duckbill valve is located in the internal passage and includes a base from which project a pair of inherently biased, complementary flaps, free ends of the flaps are oriented to open towards the outlet end. The base engages the shoulder. A mesh cap has a porous exterior wall defining a cavity in fluid communication with the interior, the cap has an open end engageable in the inlet end of the eductor body so that upon attachment of the mesh cap to the inlet end, the duckbill valve is held in position in the internal passage of the jet nozzle. A compression ring is disposed between the base of the duckbill valve and ends of internal ribs in the mesh cap. The ring is constructed and arranged so that as the mesh cap is engaged on the inlet end of the eductor body, clamping force is exerted on the base of the duckbill valve.

In one embodiment, the compression ring has a tapered internal throughbore. In another embodiment, the duckbill flaps define rectangular free ends. In an embodiment, the jet nozzle has an exterior with a plurality of knurled ribs. In an embodiment, the mesh cap is threadably engaged in the inlet end of the eductor body.

DETAILED DESCRIPTION

Figure 1:
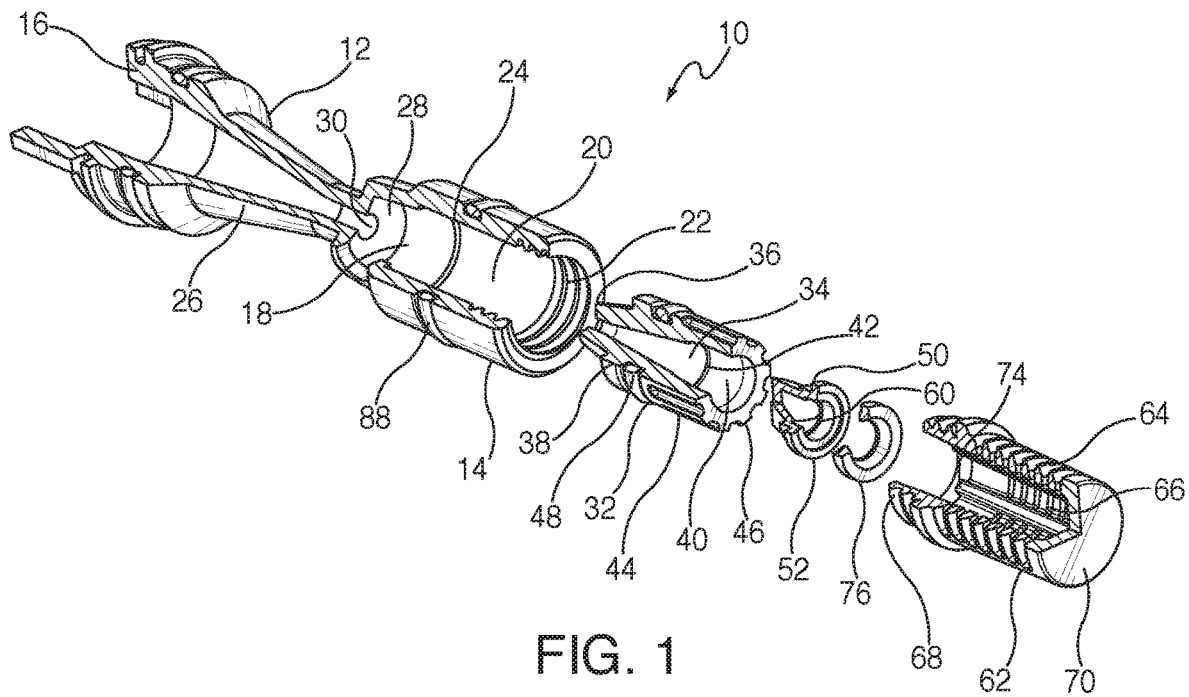
FIG. 1 is a fragmentary exploded top perspective view of the present eductor.
Figure 2:
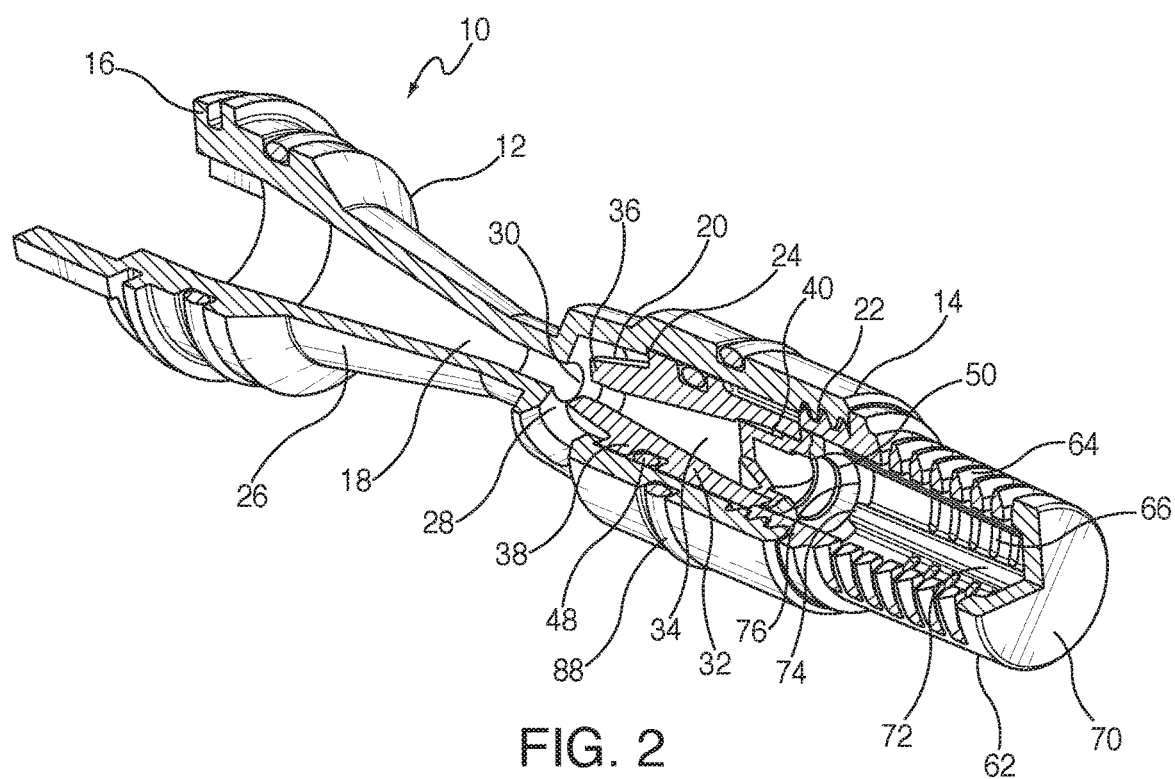
FIG. 2 is a fragmentary assembled top perspective view of the eductor of FIG. 1.
Figure 3:
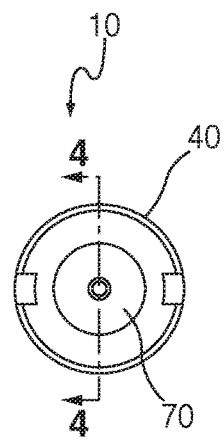
FIG. 3 is an end view of the present eductor.
Figure 4:
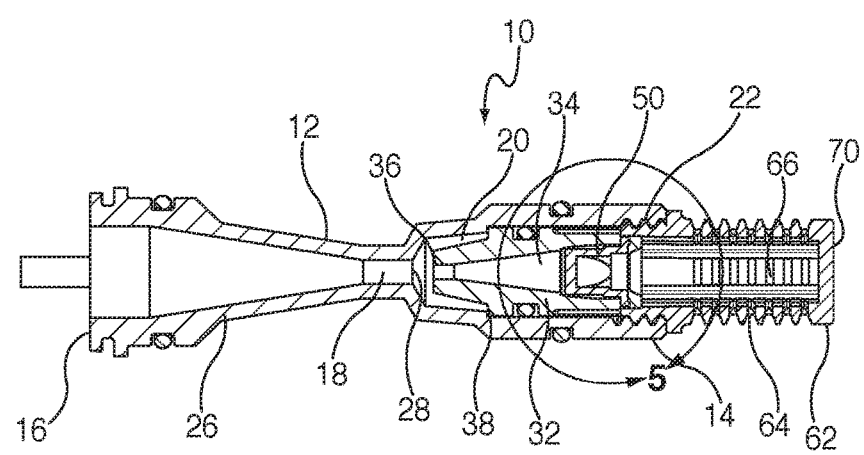
FIG. 4 is a cross-section taken along the line 4-4 of FIG. 3 and in the direction generally indicated.
Figure 6:
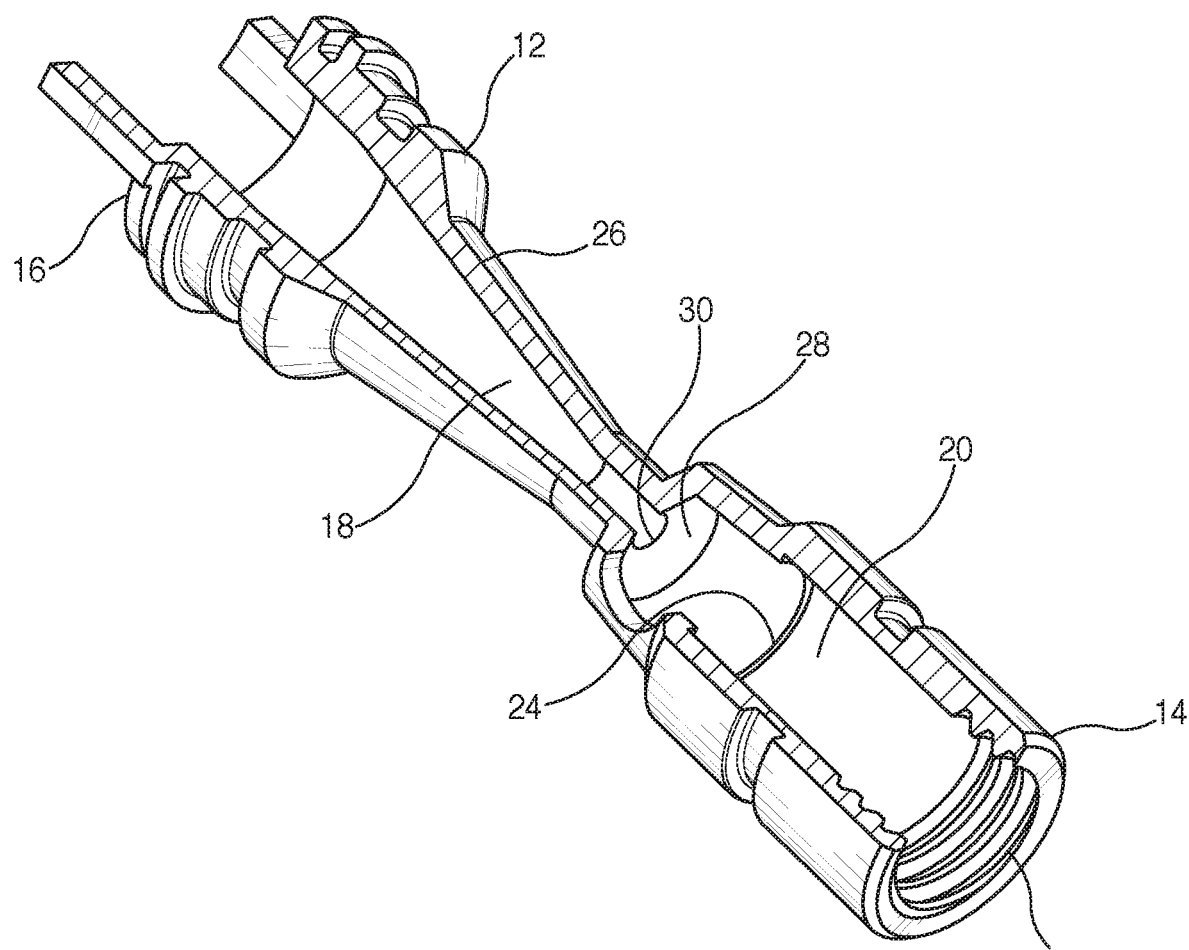
FIG. 6 is a fragmentary top perspective view of the present eductor body.
Figure 7:
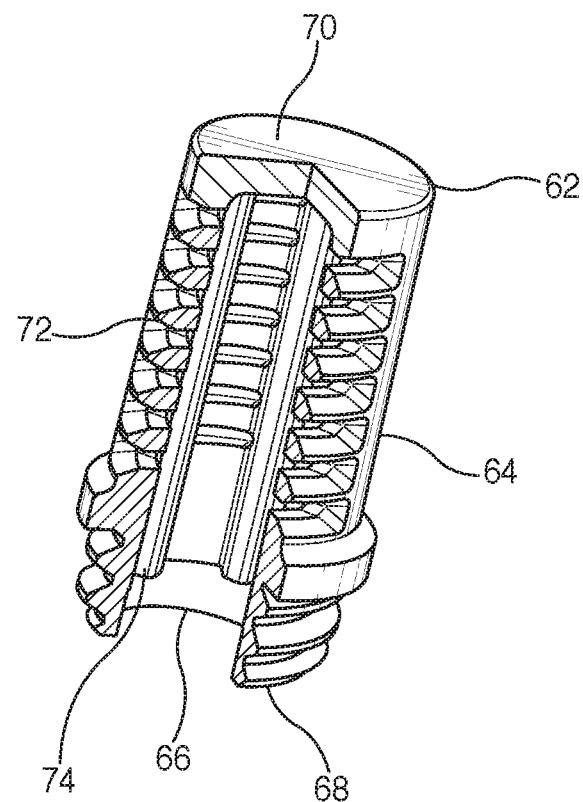
FIG. 7 is a fragmentary top perspective view of the present mesh cap.
Figure 8:
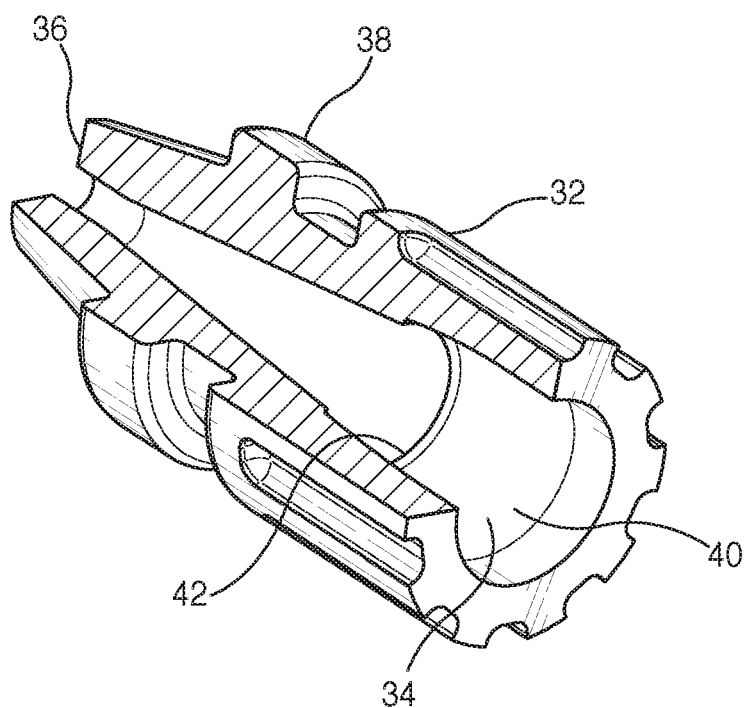
FIG. 8 is a fragmentary top perspective view of the present jet nozzle.
Figure 9:
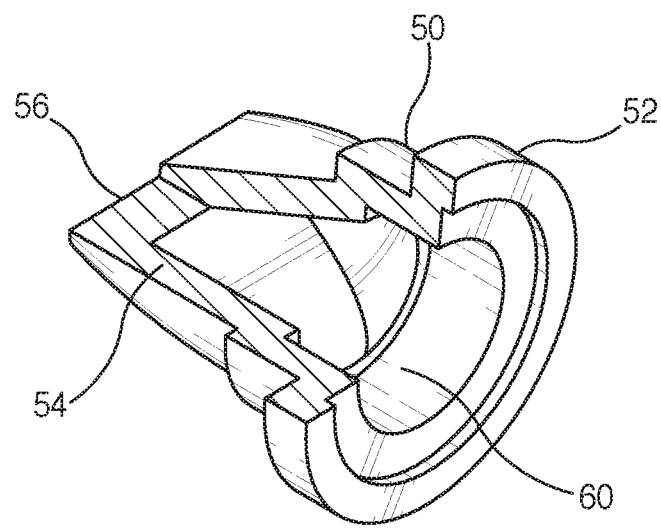
FIG. 9 is a fragmentary top perspective view of the present duckbill valve.
Figure 10A:
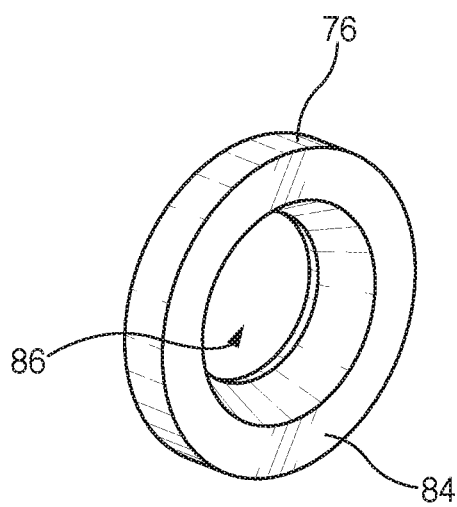
FIGS. 10A, 10B are rear and front perspective views of the present compression ring.
Figure 10B:
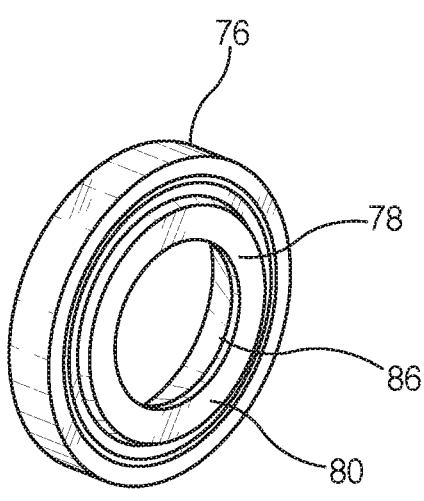

Referring now to FIGS. 1, 2 and 6, the present eductor is generally designated 10, and is designed for use with a water treatment apparatus, such as, but not limited to water softeners. In a water softener application, the present eductor 10 is contemplated as being installed in a water softener control valve 100 (FIG. 13), as is well known in the art referred to above and incorporated by reference. The present eductor 10 is used in drawing brine from a remote brine tank (not shown), through the control valve and into a water softener resin tank for recharging the softener media as is well known in the art.

Included in the eductor 10 is an eductor body 12, preferably made of a durable material such as NORYL® polyphenylene ether resin, other molded plastics, as well as other suitable materials are contemplated. An inlet end 14 is opposite an outlet end 16 on the eductor body 12, which defines an interior 18 extending between the two ends 14, 16. Within the interior 18 is a nozzle chamber 20 located closer to the inlet end 14. In the preferred embodiment, the inlet end 14 has internal threads 22, and the nozzle chamber 20 defines an annular step 24.

A flared conical portion 26 also referred to as a diffuser, of the interior 18 is closer to the outlet end 16, and the diameter of the conical portion increases closer to the outlet end. The nozzle chamber 20 and the flared conical portion 26 are separated by an internal, disk-like seat 28, which defines an opening 30 in fluid communication with the interior 18. Also, the seat 28 is associated with a narrowest diameter of the flared conical portion 26.

Referring now to FIGS. 1, 2, 5 and 8, a jet nozzle 32, also preferably made of molded plastic or suitable alternative material, is dimensioned for location in the nozzle chamber 20, and defines an internal passage 34 in fluid communication with the interior 18 of the eductor body 12. A tapered, conical outlet end 36 of the jet nozzle 32 engages the seat 28, and an annular collar 38 engages the annular step 24. Opposite the conical end 36, the jet nozzle 32 defines a duckbill valve cavity 40 including an annular shoulder 42. On an exterior 44 of the jet nozzle is found a plurality of knurled ribs 46 projecting from the inlet end 14 to the outlet end 16. At least one rubber-like O-ring 48 seals the jet nozzle 32 in the nozzle chamber 20.

Referring now to FIGS. 1, 2, 5 and 9, a duckbill valve 50 is located in the internal passage 34 and includes an annular base 52 from which project a pair of inherently biased, complementary flaps 54. Free ends 56 of the flaps 54 are oriented to open towards the outlet end 16, are inherently biased towards each other in a closed position, and while other shapes are contemplated, the free ends are rectangular or having two generally normal corners 58. 6. In the preferred embodiment, the base 52 if the duckbill valve 50 as well as the flaps 54 define a space 60 in fluid communication with the nozzle passage 34 as well as with the interior 18 of the eductor body 12. Also, the base 52 engages the annular shoulder 42 in the duckbill valve cavity 40.

In the preferred embodiment, the duckbill valve 50 is made of resilient rubber-like material, such as ethylene propylene diene monomer (EPDM) or the like. The jet nozzle 32 provides fluid compression through its tapered profile to facilitate eduction. Further, the jet nozzle 32 prevents the duckbill valve 50 from leaking. While a duckbill valve 50 is the type of preferred check valve, it is contemplated that other equivalent check valve technologies are suitable, including but not limited to slit diaphragm type, ball-type and others well known in the art, which are collectively designated here as "duckbill valves".

As is known in the art, fluid flowing through the eductor body 12, specifically through the interior 18, from the inlet 14 to the outlet 16 will cause the flaps 54 to separate and allow through flow. However, any flow of liquid in the reverse direction from the outlet 16 to the inlet 14 causes the flaps 54 to close and seal the space 60.

Referring now to FIGS. 1, 2, 5 and 7, a mesh cap 62 has a porous exterior wall 64 defining a mesh cap cavity 66 in fluid communication with the interior 18. The porous wall 64 is used for screening out resin beads and other debris that might foul the eductor 10. The mesh cap 62 has an open end 68, preferably threaded or otherwise engageable in the inlet end 14 of the eductor body 12, so that upon attachment of the mesh cap to the inlet end, the duckbill valve 50 is held in position in the internal passage 34 of the jet nozzle. Opposite the open end 68 of the mesh cap 62 is a closed end 70. Internal, generally parallel ribs 72 in the mesh cap 62 are spaced around the cavity 66 and extend generally axially in the cap. Free ends 74 of the ribs 72 are located adjacent the base 52 of the duckbill valve 50 upon assembly of the present eductor 10. As is the case with the eductor body 12, the mesh cap 62 is preferably made of molded plastic, such as NORYL® polyphenylene ether resin or similar material.

Figure 5:
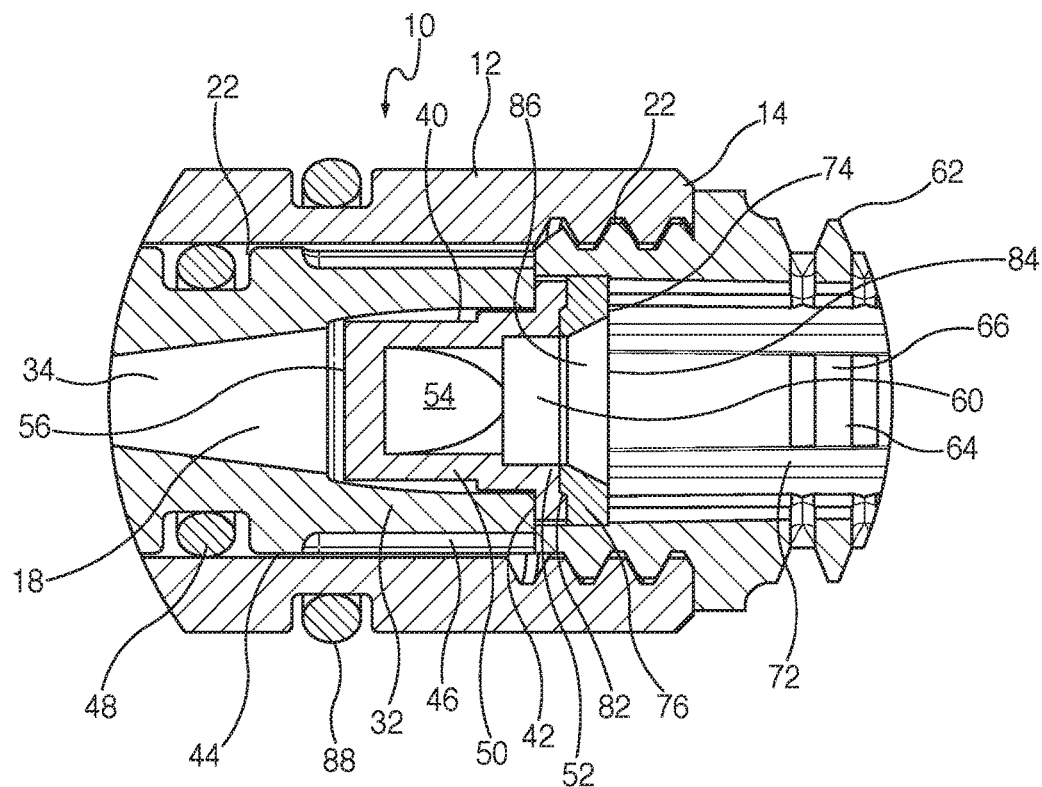
FIG. 5 is a fragmentary enlarged cross-section taken from FIG. 4.

Referring now to FIGS. 1, 2, 5, 10A and 10B, a compression ring 76 is disposed between the mesh cap 62 and the base 52 of the duckbill valve 50. More specifically, the compression ring 76 is located between the free ends 74 of the ribs 72 of the mesh cap 62 and the base 52 of the duckbill valve 50. A front surface 78 of the ring has a raised central boss 80 that engages a complementary recess 82 in the base 52. A rear surface 84 is in contact with the free ends 74 of the ribs 72 (FIG. 5). An internal throughbore 86 passes through the ring 76 and tapers from the rear surface 84 to the front surface 78. As is the case with the eductor body 12 and the mesh cap 62, the compression ring 76 is preferably made of molded plastic, such as NORYL® polyphenylene ether resin or similar material. As the mesh cap 62 is engaged upon the inlet end 14 of the eductor body 12, the compression ring 76 exerts a uniform clamping force on the base 52 of the duckbill valve 50. Thus, upon attachment of the mesh cap 62 to the inlet end 14, the duckbill valve 50 is held in position in the internal passage 34 of the jet nozzle 32. As is known in the art, O-rings 88 seal the eductor 10 relative to the control valve 100.

Figure 11:
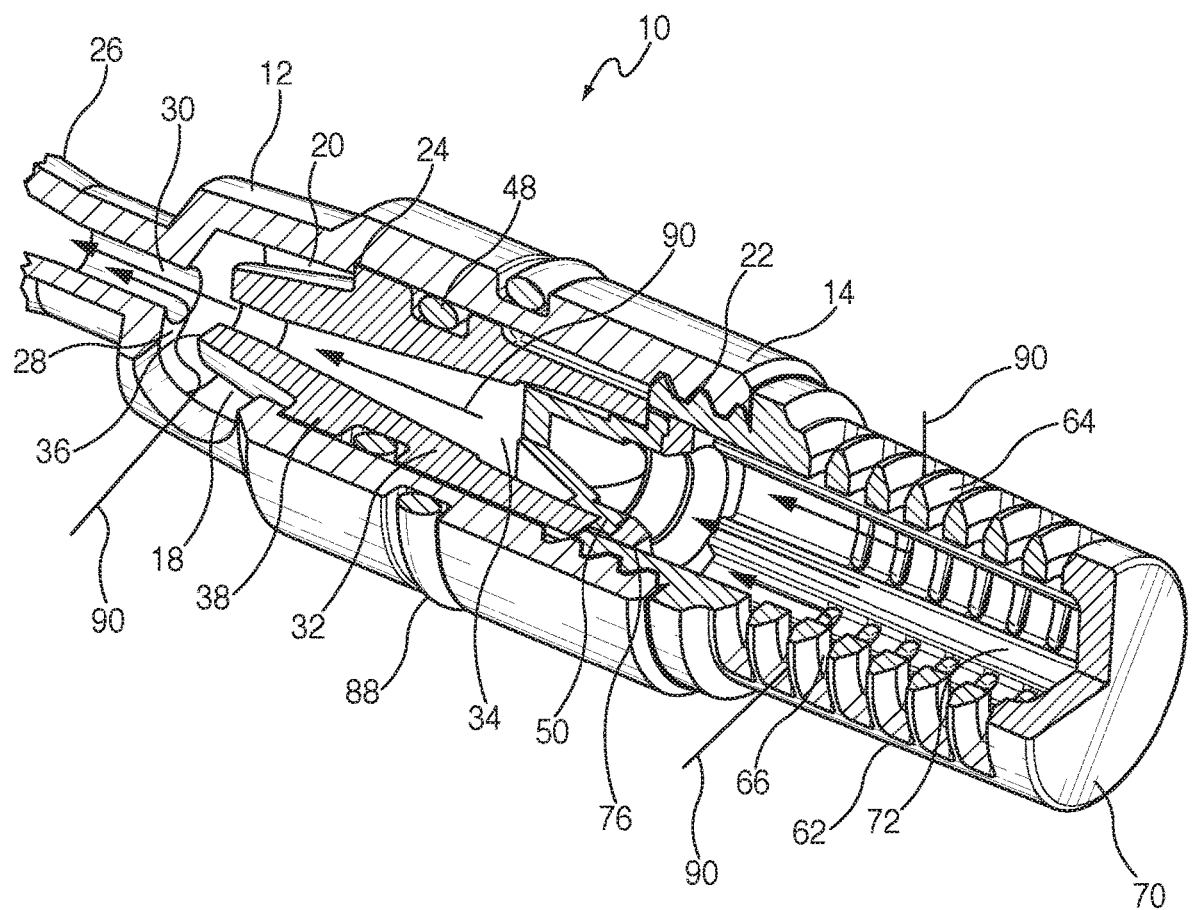
FIG. 11 is a top perspective view of the present eductor in a forward flow operation.
Figure 12:
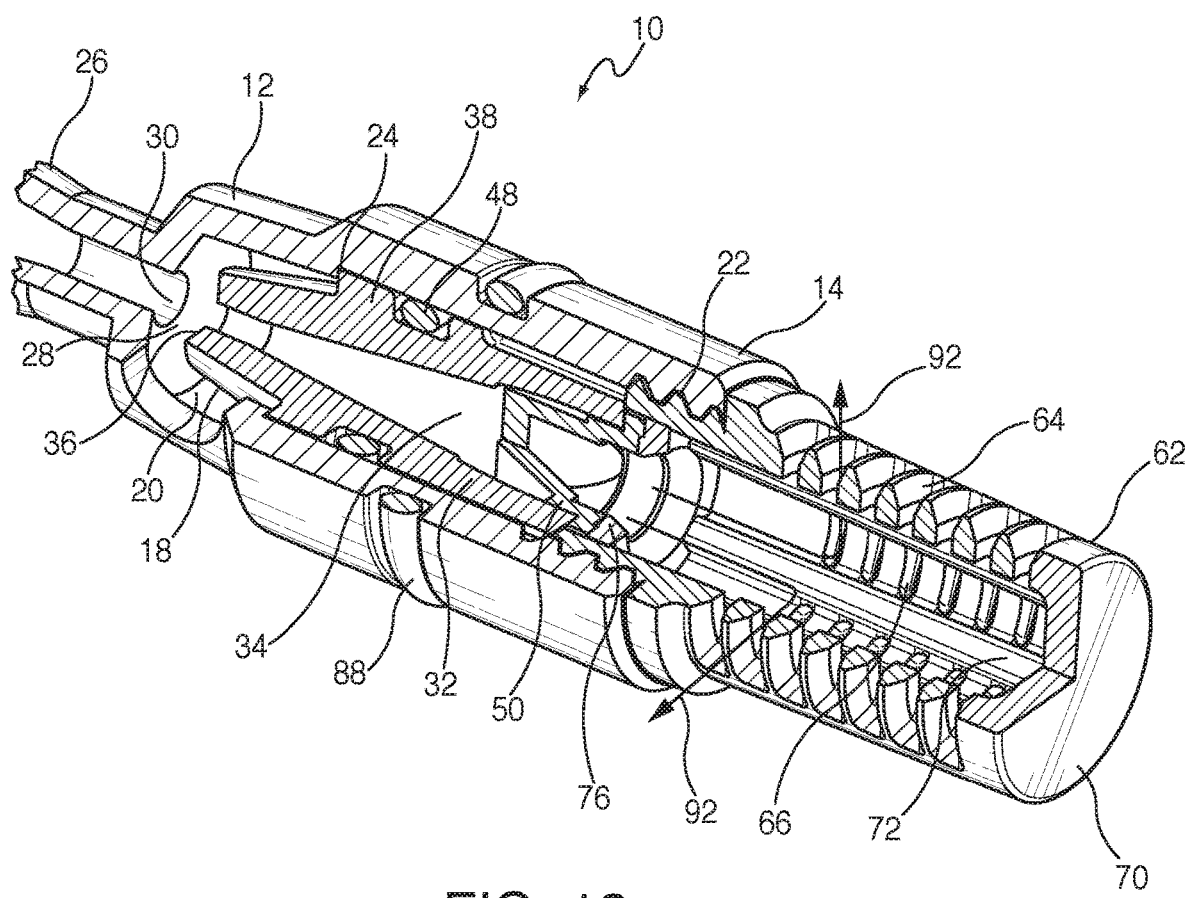
FIG. 12 is a top perspective view of the present eductor in a rear flow operation.

Referring now to FIG. 11, the present eductor 10 is shown respectfully in operation where the flow of internal fluid is in a conventional, brine draw flow pattern shown by the arrows 90. In this pattern, the flaps 54 of the duckbill valve remain open. Turning now to FIG. 12, when the flow is reversed, shown by the arrows 92, in the form of a vacuum which is applied across the inlet and outlet of the system. The vacuum begins to pull fluid from the mesh cap 62, but the flow is checked by the duckbill valve 50, which remains closed. No jetting/converging occurs; therefore, no fluid is educted.

Figure 13:
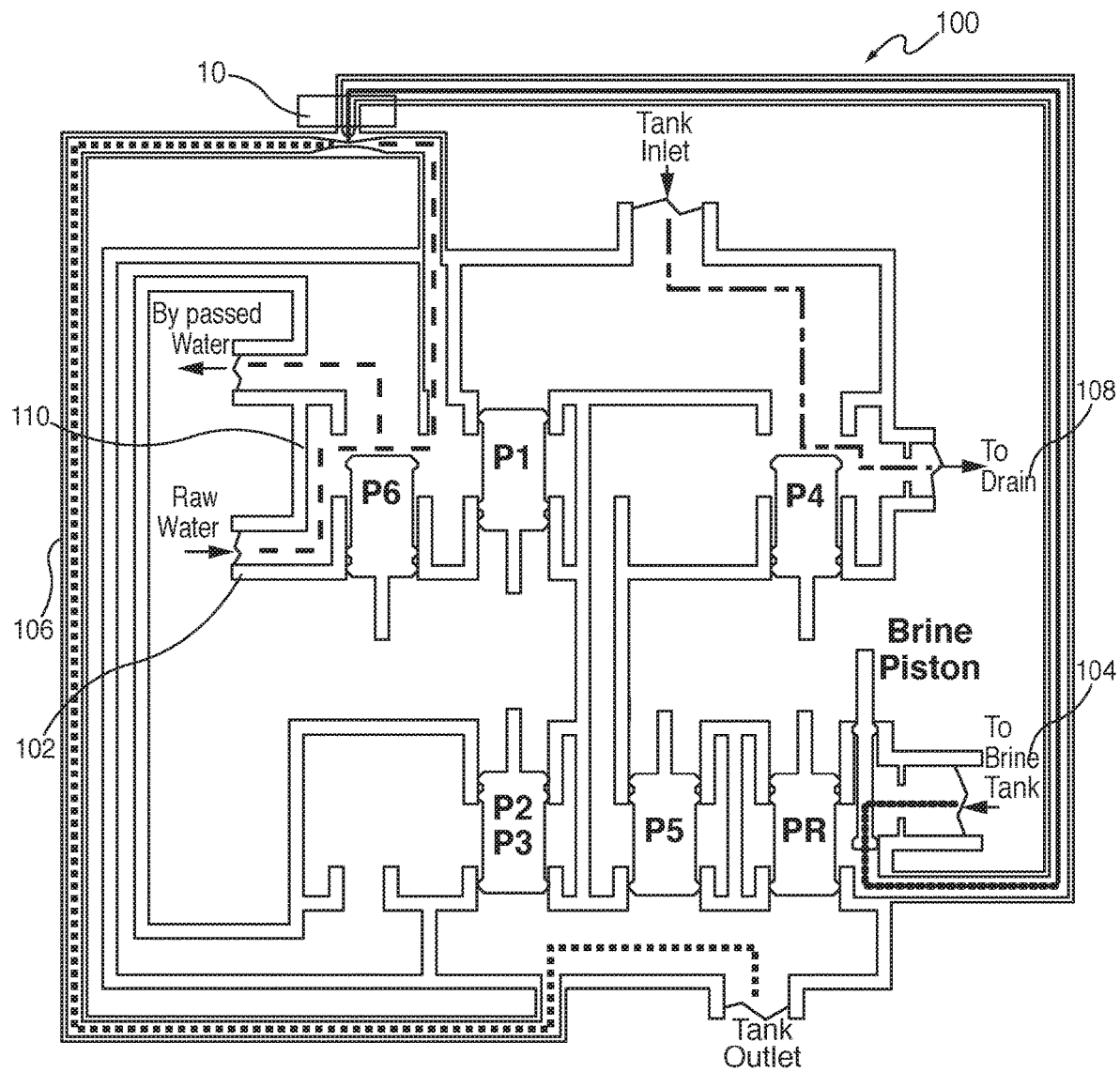
FIG. 13 is a schematic flow diagram of a softener control valve using the present eductor.

Referring now to FIG. 13, an operational schematic is presented of a typical water softener control valve, generally designated 100. The position of the present eductor 10 is indicated, as is the flow path of the various fluids during the brine draw operational sequence. Also, the position of the various control valve pistons P1, P2, P3, P4, P5, PR (Refill Piston) and a Brine Piston are shown. More specifically, raw water is directed from an inlet 102 and into the eductor body 12, passing into the flared conical portion 26. A vacuum is created and concentrated brine is educted or drawn from a brine tank 104. The raw water and concentrated brine are mixed at the eductor, to be used in passing through the resin in the treatment tank 106, and eventually to a drain 108. Once all of the brine has been educted and the brine valve seats, the unit goes into slow rinse portion of the operational cycle. Through a bypass valve 110, hard water is allowed to service during regeneration, as is known in the art.

For a given pipe size, the embedded eductor uses a valve approximately 65 to 85% smaller than one in a comparable flow control kit. The embedded valve is also subjected to only 10% of the pressure experienced at the inlet of the system, which increases the lifetime and durability of the product. This efficiency in both size and mass allows for a lower cost and lower impact design. Also, the use of a compression ring to facilitate sealing of the duckbill valve results in a leak-free condition at 13 in Hg vacuum, an upcoming standard to be published by the Water Quality association.

While a particular embodiment of the present softener eductor with an embedded check valve has been described herein, it will be appreciated by those skilled in the art that changes and modifications may be made thereto without departing from the invention in its broader aspects and as set forth in the following claims.

The invention claimed is:

1. An eductor for use in a water treatment system, comprising:
    an eductor body having an inlet end and an opposite outlet end, said body defining an interior with a nozzle chamber and a flared conical portion;
    a jet nozzle dimensioned for location in said nozzle chamber, defining an internal passage in fluid communication with said interior;
    a duckbill valve located in said internal passage and including a base from which project a pair of inherently biased, complementary flaps, free ends of said flaps oriented to open towards said outlet end; and
    a mesh cap with a porous exterior wall defining a cavity in fluid communication with said interior, said cap having an open end engageable in said inlet end of said eductor body so that upon attachment of said mesh cap to said inlet end, said duckbill valve is held in position in said internal passage of said jet nozzle.

2. The eductor of claim 1, wherein said internal passage of said jet nozzle has an annular shoulder for receiving said base of said duckbill valve.

3. The eductor of claim 1, further including a compression ring disposed between said mesh cap and said base of said duckbill valve.

4. The eductor of claim 3, further including spaced, generally parallel ribs in said mesh cap cavity which engage said compression ring.

5. The eductor of claim 3, wherein said compression ring has a tapered internal throughbore.

6. The eductor of claim 1 wherein said base of said duckbill valve is annular and defines a space in fluid communication with said interior.

7. The eductor of claim 1 wherein said duckbill flaps define rectangular free ends.

8. The eductor of claim 1 herein said jet nozzle has an exterior with a plurality of knurled ribs.

9. The eductor of claim 1 wherein said interior of said eductor housing has an internal seat, and an outlet end of said jet nozzle engages said seat.

10. The eductor of claim 9, wherein said seat defines an opening in fluid communication with said interior.

11. An eductor for use in a water treatment system, comprising:
    an eductor body having an inlet end and an opposite outlet end; said body defining an interior with a nozzle chamber and a flared conical portion;
    a jet nozzle dimensioned for location in said nozzle chamber, defining an internal passage in fluid communication with said interior, said internal passage defining an annular shoulder;
    a duckbill valve located in said internal passage and including a base from which project a pair of inherently biased, complementary flaps, free ends of said flaps oriented to open towards said outlet end, said base engaging said shoulder;

a mesh cap with a porous exterior wall defining a cavity in fluid communication with said interior, said cap having an open end engageable in said inlet end of said eductor body so that upon attachment of said mesh cap to said inlet end, said duckbill valve is held in position in said internal passage of said jet nozzle; and a compression ring disposed between said base of said duckbill valve and ends of internal ribs in said mesh cap, said ring constructed and arranged so that as said mesh cap is engaged on said inlet end of said eductor body, clamping force is exerted on said base of said duckbill valve.

12. The eductor of claim 11 wherein said base of said duckbill valve is annular and defines a space in fluid communication with said interior.

13. The eductor of claim 11 wherein said duckbill flaps define rectangular free ends.

14. The eductor of claim 11 wherein said interior of said eductor housing has an internal seat, and an outlet end of said jet nozzle engages said seat.

15. The eductor of claim 14, wherein said seat defines an opening in fluid communication with said interior.

* * * * *